Aug. 12, 1952 M. A. DAVOUST 2,606,637
CLUTCH AND BRAKE FOR POWER PRESSES
Filed March 19, 1949 2 SHEETS—SHEET 1

INVENTOR.
MARSHALL A. DAVOUST
BY
Henry L. Shenier
ATTORNEY

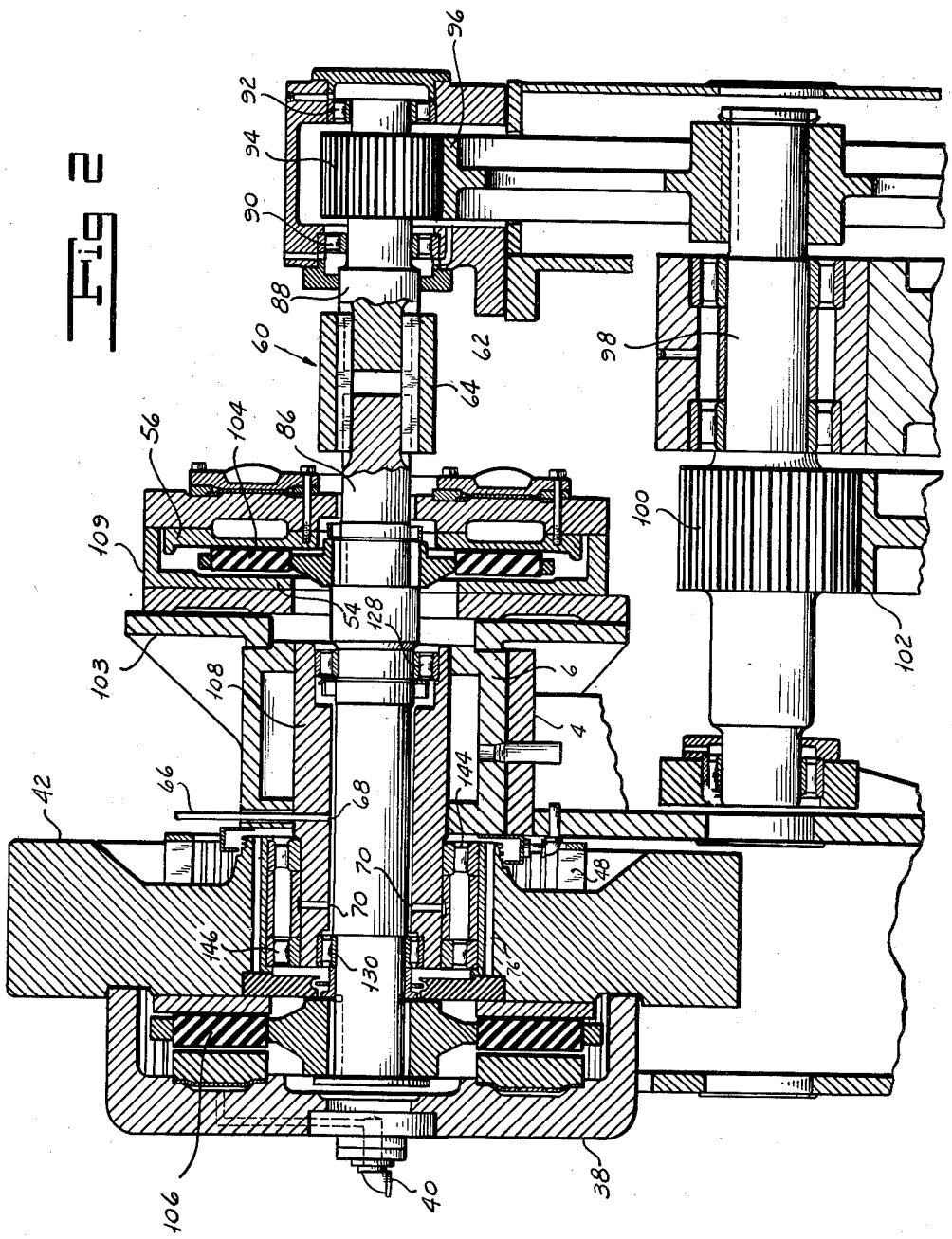

Patented Aug. 12, 1952

2,606,637

UNITED STATES PATENT OFFICE 2,606,637

CLUTCH AND BRAKE FOR POWER PRESSES

Marshall A. Davoust, Chicago, Ill., assignor to Danly Machine Specialties, Inc., Chicago, Ill., a corporation of Illinois Application March 19, 1949, Serial No. 82,427

8 Claims. (Cl. 192—18)

My invention relates to a power press flywheel mounting assembly.

In a power press, the energy is largely supplied from the kinetic energy stored in the flywheel which is driven by a prime mover, such as an electric motor. The motor serves merely to return the flywheel to speed during the large part of the cycle in which no work is done. It is customary practice in the power press art to employ a continuously running motor driving a continuously running flywheel which is usually formed of a heavy mass of metal, since large amounts of energy must be stored. Due to the difficulty of sealing joints between stationary and moving parts in connection with the fluid pressure operation of the brake and clutch assembly, overhanging flywheels, that is, flywheels supported by shafts projecting beyond supports in the form of cantilevers are employed. Since the flywheels are heavy, considerable danger exists in supporting the flywheel in this manner. Occasionally, due to crystallization of the metal in the shaft supporting the flywheel, the shaft breaks. When this occurs, the flywheel is catapulted from the press, injuring not only men, but causing considerable material damage. In an effort to provide an increased safety factor, presses have been built in which the flywheel has been mounted intermediate supporting bearings in which the shaft carrying the flywheel is supported by bearings on both sides of the flywheel. In this construction, the inner seal for the fluid pressure system for operating the clutch and brake becomes inaccessible, so that upon its failure, it is a major task to replace it. This task is not only time consuming and expensive, but results in blocking a production line of which the press may form a part.

One object of my invention is to provide an improved flywheel mounting for a power press employing an overhanging flywheel in which the flywheel is not mounted on a shaft of the press.

Another object of my invention is to provide a power press flywheel mounting assembly in which the shaft subjected to torsional strain is not used to support the weight of the flywheel.

Another object of my invention is to provide a flywheel mounting assembly in which the weight of the flywheel is carried independently of the driving shaft in a safe and convenient manner.

A further object of my invention is to provide an improved flywheel mounting for power presses in which the driving shaft may be moved without disturbing the flywheel to permit ease in maintenance of the power press brake and clutch parts.

Other and further objects of my invention will appear from the following description:

In general, my invention contemplates the mounting of a stationary quill on the pillow blocks or frame of the press. The flywheel is arranged to rotate on bearings supported by the stationary quill in a manner in which the driving shaft of the press may be clutched to the flywheel whenever it is desired to operate the press. In stopping the press the flywheel is unclutched from the driving shaft which is then braked. Since the driving shaft does not have to perform the function of supporting the heavy mass of the flywheel and must take only a torsional stress, I am enabled to supply a coupling in the driving shaft. This permits me to move the shaft axially in servicing the brake or clutch parts. Furthermore, due to the fact that the weight of the flywheel is borne independently of the driving shaft, I am enabled to design this shaft most efficiently to take torsional stress without having to take into consideration the additional duties of supporting a heavy flywheel with the required factor of safety.

In the accompanying drawings which form part of the instant specification and which are to be read in conjunction therewith, and in which like reference numerals are used to indicate like parts in the various views, Fig. 1 is a sectional elevation through the crown of a power press showing the driving shaft and the flywheel in an assembly embodying my invention. Fig. 2 is a sectional elevation similar to Fig. 1 showing another embodiment of my invention.

More particularly referring now to the drawings, the press frame 4 supports a pillow block 6 in which is mounted a quill 8. The press framework carries a pair of bearings 10 and 12 which support a shaft section 14, to which is secured the main driving pinion 16 by means of a key 18. The pinion 16 meshes with the eccentric gear 20 which is mounted upon the shaft 22 carried by the press frame. A pitman 24 is mounted on eccentric 26 for reciprocation thereby to actuate the press ram in a manner well known to the art. A pair of bearings 28 and 30 are mounted interiorly of the quill 8 to support a second shaft section 32. A clutch disc 34 is keyed to the shaft section 32 by a key 36 to constrain the clutch disc 34 to rotate with the shaft section 32. The clutch of which disc 34 forms a part is in a clutch housing 38 and may be of the fluid pressure type well known to the art, adapted to be actuated by fluid pressure through pipe 40 whereby the clutch disc 34 is clutched to the flywheel 42 whenever the clutch is set. A pair of bearings 44 and 46 are carried by the quill 8 exteriorly thereof and serve rotatively to support the flywheel 42, which is continuously driven from a suitable prime mover in an appropriate manner well known to the art. The flywheel 42 is provided with fan blades 48 which serve to circulate air through the clutch parts to carry away the heat occasioned by the intermittent operation of the clutch.

The shaft section 14 is keyed by key 50 to a brake disc 52 adapted to be clamped by spring pressure to brake plates 54 and 56, as is well known in the art. The arrangement is such that the brake is set by the action of springs 58 upon the release of fluid pressure from the brake mechanism and its imposition upon the clutch mechanism, that is, whenever the clutch is set the brake is released and upon release of the clutch the brake is automatically set by the springs.

A coupling indicated generally by the reference numeral 60 comprises a plurality of keys 62 normally held in position by a split sleeve 64. The arrangement is such that upon release of the sleeve 64 the keys may be removed and the shaft sections 14 and 32 may be moved to permit the replacement of brake or clutch parts. It will be noted that this may be readily accomplished since the weight of the flywheel is supported by the quill 8 and not by the shaft section 32. Since the shaft is not required to support the heavy mass of the flywheel, I am enabled to use a separable shaft.

It will be noted further that my arrangement lends itself to ready lubrication. Lubricant is introduced through pipe 66 through the pillow block 6 and through a passage 68 formed in the quill. The lubricant is then adapted to flow between the quill and shaft section 32 to lubricate the bearings 28 and 30. Ducts 70 formed in the quill permit the passage of lubricant to the roller bearings 44 and 46. A dam ring 72 co-acting with a flinger ring 74 permits the flow of lubricant through passages 76 and to annular collecting ring 78, and thence through passageway 80 for return through opening 82 to the sump for filtering and recirculation. The oil flowing past bearing 28 is drained through pipe 84 for return to the sump.

In Figure 1 the clutch structure is on one side of the press and the brake structure is on the other side of the press. Referring now to Fig. 2, I have shown another construction in which the press clutch and brake are mounted adjacent to the flywheel 42, and the coupling indicated generally by the reference numeral 60 joins a shaft section 86 and a shaft section 88. The shaft section 88 is mounted in bearings 90 and 92 and carries the driving pinion 94 for rotation therewith to drive the gear 96, which is secured to a shaft 98 carrying a pinion 100 meshing with a gear 102 of a driving gear train. The shaft 86 carries the brake disc 104 and the clutch disc 106 which are similar, respectively, to brake disc 52 and clutch disc 34 of Fig. 1. The quill 108 of Fig. 2 is similar to the quill 8 of Fig. 1, and the bearings 128 and 130 mounted in the quill 108 carry the shaft 86. The brake housing 109 is carried by the press framework 103 which supports the quill 108. The roller bearings 144 and 146 carried by the quill serve rotatably to support the flywheel 42 in Fig. 2.

It will readily be seen that my construction is very flexible and admits various arrangements for the placement of the clutch, the brake and the main driving pinion with an accompanying use of a coupling or couplings to admit ready access to various parts for purpose of maintenance.

It will be seen that I have accomplished the objects of my invention. I have provided an improved flywheel mounting for a power press employing a hanging flywheel in which the flywheel is not supported by a shaft of the press required to transmit tortional stresses. I have provided a flywheel mounting for power presses which is safe and in which easy access may be had to brake and clutch parts for maintenance. My arrangement is such that the bearings may be readily lubricated in a continuous manner.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a power press, a frame, shaft bearings carried by the frame, a press shaft journaled in the bearings, a quill carried by the frame, the shaft extending through the quill concentric therewith, a flywheel journaled on the quill, a clutch member carried by the shaft for rotation therewith, a co-acting clutch member carried by the flywheel adapted to couple the flywheel to the shaft, and drive transmitting means carried by the shaft.

2. In a power press, a frame, shaft bearings carried by the frame, a press shaft journaled in the bearings, a quill carried by the frame, the shaft extending through the quill concentric therewith, flywheel bearings mounted on the quill, a flywheel journaled in the flywheel bearings, a clutch disc carried by the shaft for rotation therewith, co-acting clutch members carried by the flywheel and adapted to couple the flywheel to the shaft through the clutch disc, and drive transmitting means carried by the shaft.

3. In a power press as in claim 2, one of said shaft bearings carried by the quill interiorly thereof.

4. In a power press as in claim 1, a pair of shaft bearings carried by the quill interiorly thereof, and said shaft formed with an external diameter smaller than the interior diameter of the quill, and means for introducing a liquid lubricant through the quill into the space between the exterior of the shaft and the interior of the quill.

5. In a power press, a frame, shaft bearings carried by the frame, a shaft journaled in said bearings, a quill carried by the frame, the shaft extending through the quill concentric therewith, a flywheel journaled on the quill, a clutch member carried by the shaft for rotation therewith, a co-acting clutch member carried by the flywheel adapted to couple the flywheel to the shaft, drive transmitting means carried by the shaft, said shaft being formed in a pair of sections, the shaft bearings for one of the shaft sections being carried by the quill interiorly thereof and the shaft bearings for the other of said shaft sections being carried by the frame proper, and means for coupling said shaft sections.

6. In a power press as in claim 5, a brake having a brake disc carried by one of said shaft sections, the clutch disc being carried by the other of said shaft sections.

7. In a power press as in claim 5, the shaft section which carries bearings supported by the quill carrying the clutch disc, and a brake disc mounted upon the other of said shaft sections.

8. In a power press, a frame, shaft bearings carried by the frame, a shaft journaled in the bearings, a quill carried by the frame, the shaft extending through the quill concentric therewith, flywheel bearings mounted on the quill, a flywheel journaled in the flywheel bearings, a clutch disc carried by the shaft for rotation therewith, co-acting clutch members carried by the flywheel and adapted to couple the flywheel to the shaft through the clutch disc, a pair of shaft bearings carried by the quill interiorly thereof, the shaft being formed with an external diameter smaller than the interior diameter of the quill, means for introducing a liquid lubricant through the quill into the space between the exterior of the shaft and the interior of the quill whereby to lubricate the shaft bearings, said quill being formed with a duct providing communication between the interior of the quill and the flywheel bearings whereby lubricant may flow from the interior of the quill to lubricate the flywheel bearings.

MARSHALL A. DAVOUST.

REFERENCES CITED

The following references are of record in the file of this patent:

UNITED STATES PATENTS

| Number | Name | Date |
| --- | --- | --- |
| 2,009,301 | Rode et al. | July 23, 1935 |
| 2,039,128 | Tiedemann | Apr. 28, 1936 |
| 2,180,218 | Wissman | Nov. 14, 1939 |
| 2,436,968 | Longfield | Mar. 2, 1948 |